(12) United States Patent
Connor

(10) Patent No.: US 11,162,812 B2
(45) Date of Patent: Nov. 2, 2021

(54) OPTIMAL PATH PLANNING WITH OPTICAL AIR VELOCITY SENSING

(71) Applicant: LOCKHEED MARTIN CORPORATION, Bethesda, MD (US)

(72) Inventor: Michael A. Connor, New Haven, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 188 days.

(21) Appl. No.: 16/570,431

(22) Filed: Sep. 13, 2019

(65) Prior Publication Data

US 2021/0080285 A1 Mar. 18, 2021

(51) Int. Cl.
*G01C 23/00* (2006.01)
*G01C 21/10* (2006.01)
*G01C 21/20* (2006.01)

(52) U.S. Cl.
CPC ............ *G01C 23/00* (2013.01); *G01C 21/10* (2013.01); *G01C 21/20* (2013.01)

(58) Field of Classification Search
CPC ......... G01C 23/00; G01C 21/10; G01C 21/20
See application file for complete search history.

(56) References Cited

U.S. PATENT DOCUMENTS

| 4,585,341 A | * | 4/1986 | Woodfield | G01S 17/58 356/28.5 |
| 6,871,816 B2 | | 3/2005 | Nugent | |
| 7,499,181 B2 | * | 3/2009 | Mirand | G01S 17/95 356/519 |
| 7,557,735 B1 | * | 7/2009 | Woodell | G01W 1/10 340/968 |
| 8,072,584 B2 | | 12/2011 | Caldwell | |
| 8,434,358 B2 | | 5/2013 | Asahara | |
| 9,217,643 B1 | | 12/2015 | Belenkii | |
| 2006/0155432 A1 | * | 7/2006 | Brown | H04L 67/12 701/14 |

\* cited by examiner

*Primary Examiner* — Michael J Zanelli
(74) *Attorney, Agent, or Firm* — Foley & Lardner LLP

(57) ABSTRACT

An aircraft and method of operating an aircraft. A sensor measures an air velocity at a location a selected distance from the aircraft. A processor determines an effect of the air velocity on an accuracy metric of a first flight course of the aircraft, changes from the first flight course to a second flight course when the accuracy metric of the first flight course meets a threshold and operates the aircraft according to the second flight course.

14 Claims, 2 Drawing Sheets

OPTIMAL PATH PLANNING WITH OPTICAL AIR VELOCITY SENSING

BACKGROUND

The embodiments disclosed herein relate to a system and method for operating an aircraft and, in particular, to a system and method for sensing an air velocity at a location in a flight path of the aircraft and operating the aircraft based on the sensed air velocity.

Autopilots and autonomous aircraft often fly according to flight plans and use various data, such as inertial measurement data, Global Positioning Satellite (GPS) data, data from terrain databases and perception sensors. Included in this data is data regarding the air, such as air temperature, air velocity, etc. Relevant air velocity sensors are positioned on the aircraft and provide air velocity data at the location of the aircraft, rather than at a location ahead of the aircraft. Without the ability to determine air conditions at locations ahead of the aircraft, the aircraft is confined to performing sub-optimal reactions to wind conditions upon approaching the location or to attempting to execute unachievable flight plans due to air conditions at the location.

BRIEF DESCRIPTION

According to an embodiment, a method of operating an aircraft is disclosed. The method includes measuring, at a sensor of the aircraft, an air velocity at a location a selected distance from the aircraft, determining, at a processor, an effect of the air velocity on an accuracy metric of a first flight course of the aircraft, changing from the first flight course to a second flight course when the accuracy metric of the first flight course meets an accuracy threshold; and operating the aircraft according to the second flight course.

In addition to one or more of the features described above, or as an alternative, the air velocity is determined at the selected distance from the aircraft via an optical sensor conveyed on the aircraft.

In addition to one or more of the features described above, or as an alternative, the effect of the air velocity is determined at the selected location of the first flight course.

In addition to one or more of the features described above, or as an alternative, the second flight course is calculated based on the air velocity at the selected distance from the aircraft.

In addition to one or more of the features described above, or as an alternative, the second flight course is selected from a database.

In addition to one or more of the features described above, or as an alternative, the accuracy metric of the first flight course includes at least one of a safety metric and a mission performance metric. The safety metric can be compared to a safety threshold and the mission performance metric can be compared to a mission performance threshold, or both.

According to another embodiment, an aircraft is disclosed. The aircraft includes a sensor and a processor. The sensor is configured to measure an air velocity at a location a selected distance from the aircraft. The processor is configured to determine an effect of the air velocity on an accuracy metric of a first flight course of the aircraft, change from the first flight course to a second flight course when the accuracy metric of the first flight course meets a threshold, and operate the aircraft according to the second flight course.

In addition to one or more of the features described above, or as an alternative, the sensor further includes an optical sensor conveyed on the aircraft.

In addition to one or more of the features described above, or as an alternative, the optical sensor is configured to measure the air velocity at the selected distance.

In addition to one or more of the features described above, or as an alternative, the processor is further configured to determine the effect of the air velocity at the selected location of the first flight course.

In addition to one or more of the features described above, or as an alternative, the processor is further configured to calculate the second flight course based on the air velocity at the selected distance from the aircraft.

In addition to one or more of the features described above, or as an alternative, the accuracy metric of the first flight course includes at least one of a safety metric and a mission performance metric. The processor is further configured to perform at least one of comparing the safety metric to a safety threshold and compare the mission performance metric to a mission performance threshold.

In addition to one or more of the features described above, or as an alternative, the aircraft is one of: (i) a fixed wing aircraft; and (ii) a rotary wing aircraft.

In addition to one or more of the features described above, or as an alternative, in further embodiments

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
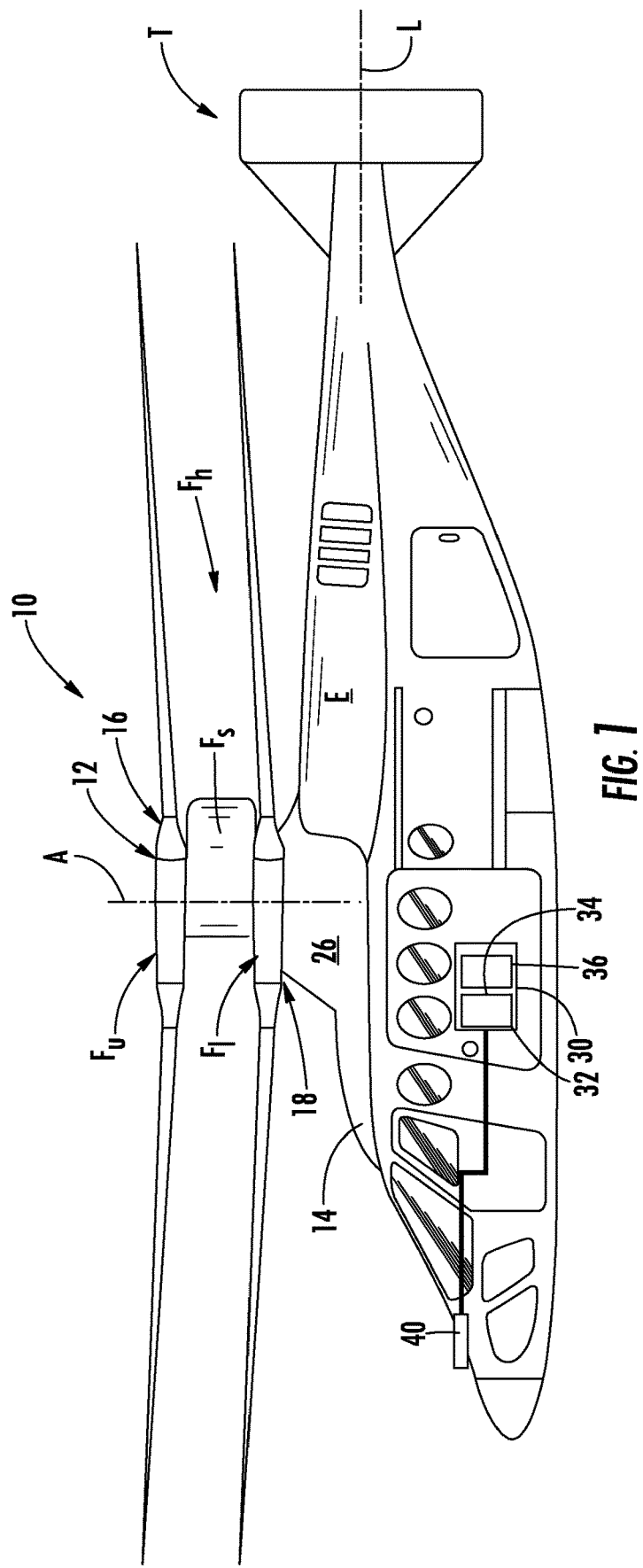
FIG. 1 illustrates an exemplary vertical takeoff and landing (VTOL) rotary-wing aircraft having a dual, counter-rotating, coaxial rotor system which rotates about an axis of rotation.

FIG. 1 illustrates an exemplary vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system T which provides translational thrust generally parallel to an aircraft longitudinal axis L. Although a particular aircraft configuration is illustrated in the disclosed embodiment, any type of aircraft systems will benefit from the present invention, including various other rotary aircraft. Additionally, the aircraft can be a fixed wing aircraft in various embodiments.

A main gearbox 26, which may be located above the aircraft cabin, drives the coaxial rotor system 12. The translational thrust system T may be driven by the same main gearbox 26 which drives the coaxial rotor system 12. The main gearbox 26 is driven by one or more engines (illustrated schematically at E). As shown, the main gearbox 26 may be interposed between the gas turbine engines E, the coaxial rotor system 12 and the translational thrust system T.

The aircraft 10 includes a control unit 30 for autonomous control of the aircraft. The control unit 30 includes a processor 32 and a storage medium 34 that includes various programs or instructions 36 stored therein. When accessed by the processor 32, the programs or instructions 36 enable the processor 32 to control various aspects of the aircraft includes control of flight surfaces, engine torque, gearbox, etc., in order to provide autonomous control of the aircraft 10. The control unit 30 receives various input, such as Global Positioning Satellite (GPS) data, flight commands, flight plans, terrain data, environmental data for calculation of the control commands to be implemented at the aircraft.

The aircraft 10 further includes an air velocity sensor 40 for determining an air velocity or wind velocity at a location at a non-zero distance from the aircraft. In various embodiments, the air velocity sensor 40 includes an optical sensor that monitors the velocities of airborne particulates, thereby monitoring the air velocity at long distances ahead of the aircraft. In one embodiment, the air velocity sensor 40 includes a laser that directs a laser beam at a first frequency along a heading of the aircraft. A reflection of the laser beam off of air molecules at a selected distance away from the aircraft changes the frequency of the reflected laser beam to a second frequency. The change in frequency between the first frequency and second frequency can be used to determine the wind velocity of the air at the selected distance. The measurements of wind velocity can be provided to the processor 32 in order to determine an ability of the aircraft to successfully complete a flight plan.

Figure 2:
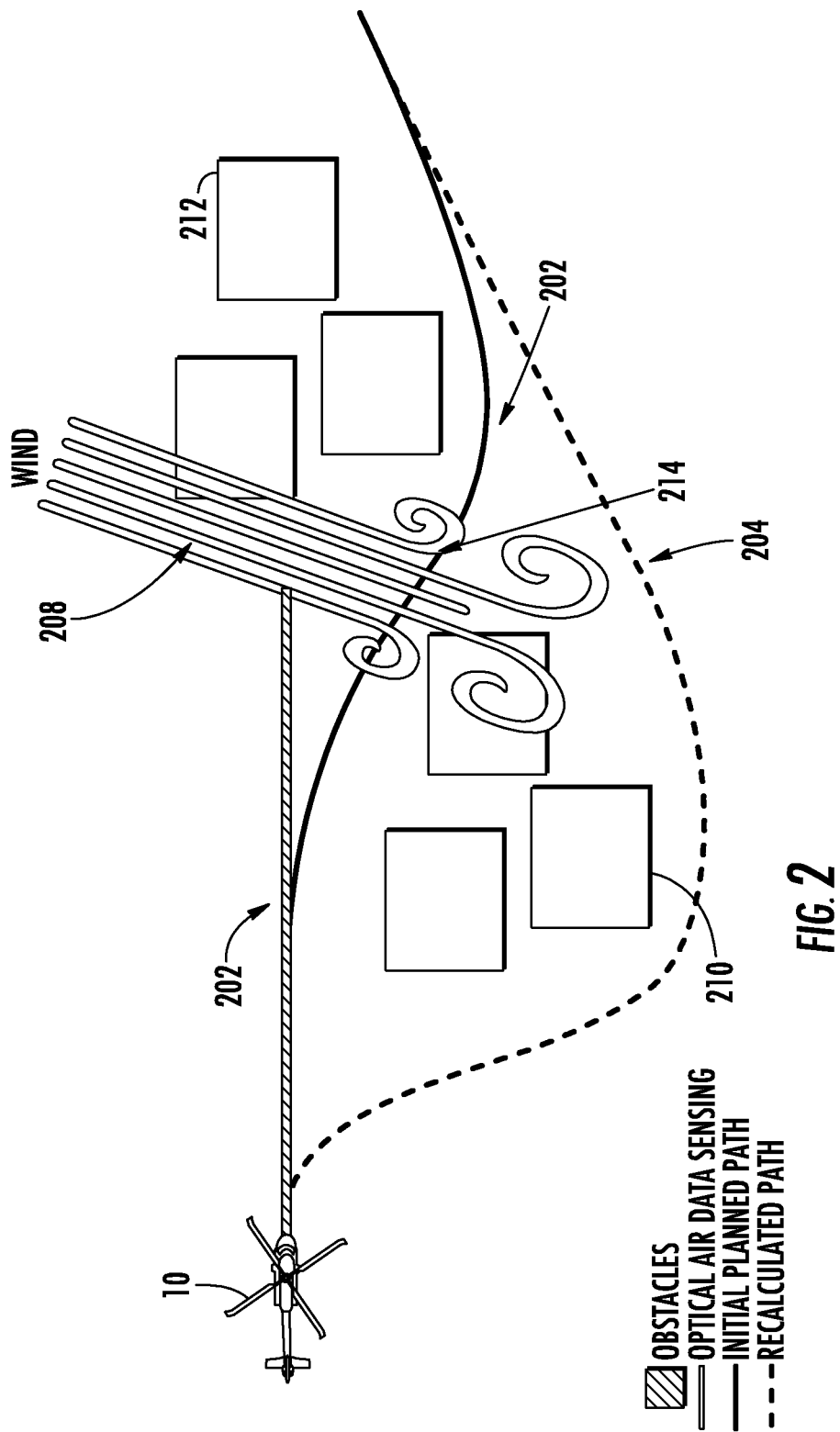
FIG. 2 shows a bird's-eye view of an illustrative scenario for an aircraft 10 illustrating a capability of the aircraft to adjust a flight course based on imminent or approaching wind conditions.

FIG. 2 shows a bird's-eye view of an illustrative scenario 200 for an aircraft 10, illustrating a capability of the aircraft 10 to adjust a flight course based on imminent or approaching wind conditions, whereas an approaching wind condition can also refer to a wind condition at a location along a heading of the aircraft. The aircraft 10 is shown with respect to an illustrative terrain that includes various obstacles 210 and 212, which can be mountains, buildings, etc. As shown, a passage 214 or valley separates obstacles 210 from obstacles 212. A first flight course 202 navigates the aircraft 10 with respect to the obstacles 210 and 212 by flying the aircraft through the passage 214.

The passage 214 between the obstacles 210 and 212 may be enough to accommodate the aircraft 10 during still-air conditions or substantially no wind conditions. However, an environmental condition 208 such as high wind velocity occurring at the passage 214 can affect the success of the first flight course 202. For example, the first flight course 202 can be selected based on a certain wind velocity (e.g., no wind) along the flight course (e.g., wind velocity in the passage 214). However, at high wind velocities, a margin of safety for flying the aircraft 10 through the passage 214 can be reduced to a value too low for acceptable flight. Alternatively, the high wind velocities can make execution of the first flight course 202 too long or too energy-consuming to make the first flight course feasible.

In various embodiments, the air velocity sensor 40 measures an air velocity at a selected location away from the aircraft, such as at a location that is in a straight-line direction in front of the aircraft 10. The selected location can be a location within a first flight course of the aircraft 10. The selected location is a distance away from the aircraft along a heading of the aircraft, and the wind velocity or wind condition is therefore a wind condition that has not been experienced at the aircraft since the aircraft has not yet reached the selected location at which the wind conditions is detected. Upon detecting the selected location of the detected air velocity, the processor 32 can calculate or predict an effect of the air velocity on the first flight course 202. For the illustrative scenario 200, the processor 32 can predict an ability of the aircraft 10 to successfully complete its first flight course 202 through passage 214. The processor 32 can compute an accuracy metric of the first flight course 202 given the measured wind velocity in the passage 214. If the accuracy metric falls below a selected accuracy threshold, the processor 32 can select to proceed along a different flight course. The accuracy metric cans be a safety metric or a mission performance metric, which can be compared to a safety threshold value or a selected mission performance threshold, respectively.

FIG. 2 shows a second flight course 204 that flies the aircraft 10 around the obstacles 210 and 212, thereby avoiding the conditions in the passage 214 caused by the high wind velocities. In various embodiments, the processor 32 can calculate the second flight course 204 based on the wind velocity and can then select the second flight course over the first flight course 202. In other embodiments, the processor 32 can select a second flight course 204 from a database of pre-calculated flight courses when the relevant metrics of the first flight course 202 fall below their respective thresholds.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of operating an aircraft, comprising:
   measuring, at a sensor of the aircraft, an air velocity at a location a selected distance from the aircraft;
   determining, at a processor, an effect of the air velocity on an accuracy metric of a first flight course of the aircraft;
   selecting, from a database, a second flight course when the accuracy metric of the first flight course meets an accuracy threshold;
   changing from the first flight course to the second flight course; and
   operating the aircraft according to the second flight course.

2. The method of claim 1, further comprising determining the air velocity at the selected distance from the aircraft via an optical sensor conveyed on the aircraft.

3. The method of claim 1, further comprising determining the effect of the air velocity at the selected location of the first flight course.

4. The method of claim 1, further comprising calculating the second flight course based on the air velocity at the selected distance from the aircraft.

5. The method of claim 1, wherein the accuracy metric of the first flight course includes at least one of a safety metric and a mission performance metric.

6. The method of claim 5, further comprising at least one of comparing the safety metric to a safety threshold and comparing the mission performance metric to a mission performance threshold.

7. An aircraft, comprising:
- a sensor configured to measure an air velocity at a location a selected distance from the aircraft; and
- a processor configured to:
  - determine an effect of the air velocity on an accuracy metric of a first flight course of the aircraft;
  - select, from a database, a second flight course when the accuracy metric of the first flight course meets a threshold;
  - change from the first flight course to the second flight course; and
  - operate the aircraft according to the second flight course.

8. The aircraft of claim 7, wherein the sensor further comprises an optical sensor conveyed on the aircraft.

9. The aircraft of claim 8, wherein the optical sensor is configured to measure the air velocity at the selected distance.

10. The aircraft of claim 7, wherein the processor is further configured to determine the effect of the air velocity at the selected location of the first flight course.

11. The aircraft of claim 7, wherein the processor is further configured to calculate the second flight course based on the air velocity at the selected distance from the aircraft.

12. The aircraft of claim 7, wherein the accuracy metric of the first flight course includes at least one of a safety metric and a mission performance metric.

13. The aircraft of claim 12, wherein the processor is further configured to perform at least one of comparing the safety metric to a safety threshold and compare the mission performance metric to a mission performance threshold.

14. The aircraft of claim 7, wherein the aircraft is one of: (i) a fixed wing aircraft; and (ii) a rotary wing aircraft.

* * * * *